July 24, 1951  E. L. HOLLYWOOD  2,561,864
STRUCTURAL CLAMP
Filed Jan. 21, 1947

INVENTOR.
EDWIN L. HOLLYWOOD
BY Harold W. Mattingly
Attorney

Patented July 24, 1951

2,561,864

UNITED STATES PATENT OFFICE 2,561,864

STRUCTURAL CLAMP

Edwin L. Hollywood, Glendale, Calif., assignor to Pan-Continental Corporation, Los Angeles, Calif., a corporation of California Application January 21, 1947, Serial No. 723,309

3 Claims. (Cl. 304—5)

This invention relates to clamps for forming lumber or other structural members into a sawhorse or scaffolding, and has particular reference to a sawhorse clamp that may be readily attached to or removed from such structural members.

Clamps for securing scaffolding and sawhorses together are conveniently used inasmuch as they may be quickly applied to form a structure of great rigidity. Further, sawhorses are much too bulky to be profitably carried from one construction job to another, and for this reason clamps of small size are utilized instead. Accordingly lumber may be joined into a sawhorse or scaffolding on each specific construction job by the use of clamps.

The present invention may be embodied in a clamp formed of two parts that are hinged together. Teeth may be formed on adjacent portions of the clamp to positively grip a two-by-four or other structural element forming the crosspiece of the sawhorse or other structure. A toggle may be employed to hold the teeth in engagement with the two-by-four. A socket may be provided in each part of the clamp for the reception of boards to form the legs of a sawhorse. An alternative form may include sockets for the reception of two-by-fours when the clamp is used in the construction of scaffolding.

It is an object of the invention to provide an improved sawhorse clamp of simple design.

Another object of the invention is to provide a two-part sawhorse clamp wherein the parts are hinged or pivoted together.

Still another object of the invention is to provide a combined sawhorse and scaffolding clamp.

Another object of the invention is to provide a sawhorse clamp having a toggle spreader for positively engaging a structural member.

A still further object of the invention is to provide a sawhorse clamp of sheet metal construction.

Other objects and advantages of the invention will be apparent in the following description and claims, considered together with the accompanying drawings, in which Fig. 1 is a perspective view of one end of the sawhorse fabricated by utilizing a clamp embodying the invention;

Figure 1:
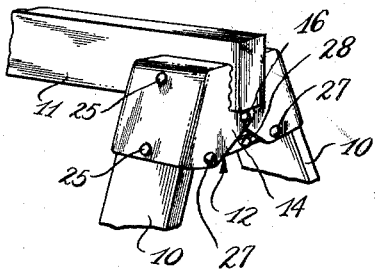

Referring to Fig. 1, a sawhorse may include legs 10 rigidly positioned with respect to a crossbar 11 by means of a sawhorse clamp 12. The legs 10 may support the clamp and the cross bar 11 to form one end of the sawhorse. A similar structure on the other end of the cross bar 11 will complete the sawhorse structure.

Figure 2:
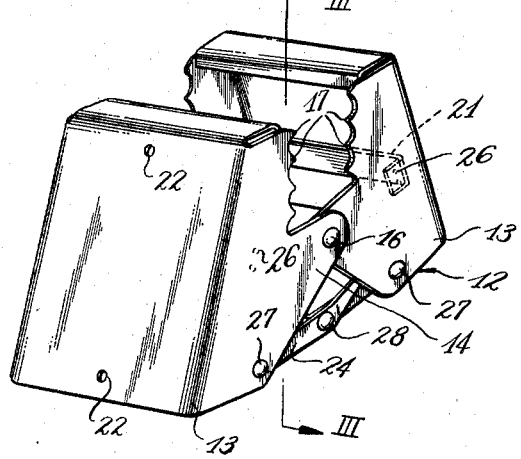
Fig. 2 is an enlarged perspective view of the clamp of Fig. 1.
Figure 3:
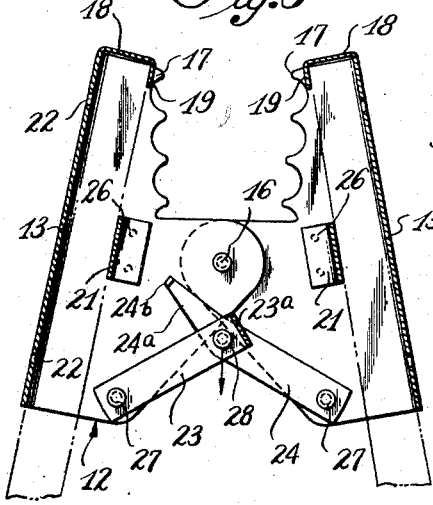
Fig. 3 is a sectional view of the clamp of Fig. 2 taken along the line III—III of Fig. 2.

Referring to Figs. 2 and 3, it will be noted that the clamp 12 may be formed basically from two elongated U-shaped members 13, each edge of which may have projecting ears 14 through which pivot pins 16 may pass to pivot the two U-shaped members 13 together. The pin 16 may be in the form of a rivet if desired. The upper portions of the adjoining edges of the U-shaped members 13 may be formed with projecting teeth 17 so that a transverse member may be positively engaged, for example the sawhorse crosspiece 11 of Fig. 1. Both members 13 may be formed identically so that only one die or other forming machinery is needed.

A socket may be formed within each U-shaped member 13 to retain the legboards 10, and may include a turned-over top edge 18 on each member 13 and including a downwardly projecting lip 19. The transverse strip 18 may wholly or partially close off one end of the channel formed by the elongated U shapes 13. The socket may also include a brace 21 in each member spanning the U-shaped opening and spaced from the outer wall of the U shape by an appropriate distance to permit the insertion of a standard size of board. For example, this spacing may be slightly in excess of 3/4" to receive a nominal 1" board. The bottom of the elongated U shape of each member may be formed with apertures 22 through which nails 25 may be inserted to positively lock and engage the sawhorse legs in the clamp, as shown in Fig. 1.

The sawhorse clamp is shown in its open position in Fig. 3, in which position the teeth 17 are spread sufficiently far apart to permit the insertion of any desired structural member. For example, if the clamp is designed for use with two-by-fours, the spacing between the upper teeth may be approximately two inches, since the nominal two-by-four is slightly less than two inches thick. After insertion of a two-by-four between the teeth, for example the cross bar 11 shown in Fig. 1, the two U-shaped members 13 may be rotated so that the teeth 17 approach each other. This rotational function may be performed by any desired mechanism, and a presently preferred mechanism includes a toggle construction wherein a U-shaped member 23 may be engaged at the base of its U shape by links 24. The extreme tips of the U-shaped member 23 may be pivoted to the lower end of the one member 13, and the links 24 may be pivoted to the bottom end of the other member 13. Accordingly the crosspiece 23a of the U-shaped toggle member 23 may be manually grasped and pulled downwardly as indicated by the arrow in Fig. 3. This will cause the two U-shaped members 13 to pivot so that their upper ends will approach each other and so that the teeth 17 will bite into a structural member disposed between them. The toggle construction 23 and 24 may be locked to hold the teeth in engagement with the structural member. This lock may include a projecting end 24a on one or both links 24, which end may terminate in an inwardly bent tip 24b that will engage the top surface of the U-shaped toggle member 23 when the toggle is fully extended as shown in Fig. 2.

It will be noted further with respect to Figs. 2 and 3 that the sawhorse clamp 12 may be made entirely of sheet metal wherein stationary joints may be secured by welding or by riveting and movable joints may be secured by rivets. Accordingly the U-shaped members 13 may be made from a single flat sheet of sheet metal and bent in one or more operations to the shape shown in Fig. 2. The socket brace 21 may then be inserted between the side walls of the U-shaped members 13 and secured therein as by spot welds 26 or by rivets. The pivot between the two members may be formed by utilizing a rivet for the pivot pins 16, as mentioned, and the toggle members 23 and 24 may be secured to the U-shaped members 13 by rivets 27 and may be secured together by means of rivets 28. The teeth 17 are preferably formed as scallops, giving much greater strength than conventional saw teeth. The construction accordingly is not only inexpensive to manufacture, but is simple and rugged.

The operation of the embodiment of the invention illustrated in Figs. 1, 2, and 3 is as follows. The toggle members 23 and 24 may be moved to their retracted position as shown in Fig. 3 by manually pushing upwardly on the toggle cross bar 23a. A structural element may then be inserted between the teeth 17, for example a two-by-four as illustrated at 11 in Fig. 1. The toggle cross bar 23a may then be manually grasped and pulled downwardly until the toggle is in a generally straight position as shown in Fig. 2, wherein the toggle is past dead center, giving a positive locking action. This straight position of the toggle will be maintained by virtue of the top 24b on one part of the toggle contacting the top surface of the U-shaped toggle member 23. In the event that the cross bar 11 inserted between the teeth is extremely hard and difficult for the teeth 17 to penetrate, the operation of the toggle may be assisted by pounding on the U-shaped members 13 back of the teeth 17 while maintaining a downward pull on the toggle. The legs 10 for forming a sawhorse may next be inserted and are positioned therein by virtue of a socket formed by the turned-in upper edge 18 and the cross bars 21. The legs 10 may be retained within the socket of each U-shaped member 13 by inserting nails in the apertures 22, for example the nails 25 of Fig. 1. While the clamp of Figs. 1, 2, and 3 is designed especially for sawhorse use, it is obvious that elongated boards 10 may be utilized for scaffolding purposes as well as sawhorses.

A presently preferred form of the invention is designed for sawhorse use wherein the elongated U-shaped members 13 may be approximately 6" long and 4" wide. The spread between the open teeth may be about 2", and when the toggle is actuated to close the teeth, this spread may be reduced to about 1½" or 1⅜" at the top. A heavy gauge of sheet steel is preferred, and 12 and 16 gauge steel has been found quite satisfactory. The braces 21 may be secured approximately ¾" from the back of the U-shaped members 13, as mentioned previously, and a dimension of 1⅜" has been found quite satisfactory for this purpose.

Figure 4:
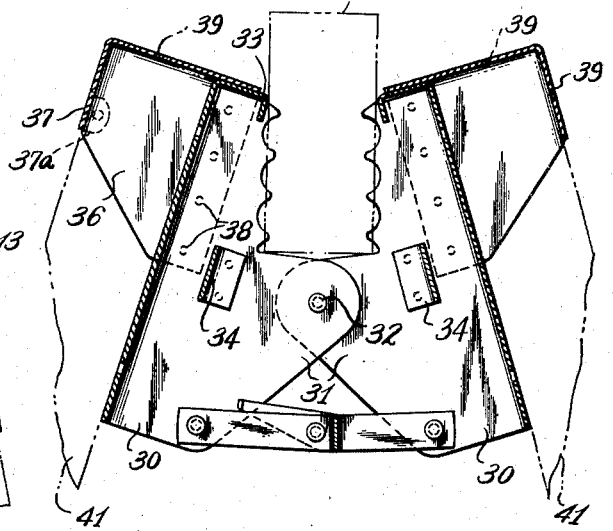
Fig. 4 is a sectional view through a modified form of clamp embodying the invention.

Shown in Fig. 4 is a modified form of the invention wherein auxiliary sockets are provided for the U-shaped members for the retention of two-by-four uprights so tht the clamp may be used for heavy-duty scaffolding. Accordingly two U-shaped members 30 may be pivoted together in any suitable manner, for example by means of projecting ears 31 pivoted together by rivets 32. The top of the U-shaped members 30 may be turned in as at 33 and the board-receiving socket may be completed by providing a cross bar 34 in each U-shaped member 30. A socket for two-by-fours may be provided by passing a strap of metal 36 up one side of each U-shaped member 30, across the top, and down the other side. An outer ear 37 on the strap member may be bent downwardly to complete the socket. The strap 36 may be welded to the U-shaped members 30, for example by spot welds 38, or it may be riveted. Suitable apertures 39 may be provided within the strap 36 and its ear 37 through which nails, screws, or other fasteners may be passed for holding the two-by-fours in the socket.

The operation of the modification of Fig. 4 is basically the same as that for the clamp illustrated in Figs. 1, 2, and 3. The pivoted U-shaped members 30 may be opened so that a two-by-four element 40 or other structural member may be passed between the teeth formed in each U-shaped member, and any suitable mechanism may be operated for causing the teeth to engage the member 40. For example a toggle mechanism similar to or identical to that of the first embodiment may be employed. Two-by-fours 41 may then be inserted in the socket formed by the strap 36 and its ear 37, and nails may be pounded into the apertures 39 to secure these upright two-by-fours in position. The provision of the auxiliary strap 36 makes the clamp of Fig. 4 useful not only as a sawhorse clamp, but also as a heavy-duty scaffolding clamp, inasmuch as scaffolds of great height must be supported by uprights of the size of two-by-fours.

The construction of the clamp of Fig. 4 may be similar to that of the first embodiment; namely, from sheet metal bent to shape and welded and riveted together. The ears 37 may be either seam-welded to the strap 36, or may include ears 37a which may be folded around the edge of the strap 36 and spot-welded. It will also be noted that the strap 36, in passing over the top of the U-shaped members 30, gives support to the inwardly projecting ends 33 that form a part of the socket for receiving sawhorse boards.

Although the invention has been described with respect to specific embodiments thereof, it is not limited to these embodiments, since it is obvious that various modifications may be made therein without departing from the true spirit and scope of the invention. For example, the clamp could be made as a casting and could be made of any desired metal, such as brass, cast iron, or even pot metal. Likewise various fasteners could be utilized other than spot welds, for example seam welds, rivets, bolts, and self-threading screws. Also pivot fasteners other than rivets could be used, including bolts and nuts and kindred fasteners. Accordingly the invention is limited only by the terms of the following claims.

What is claimed is:

1. In a sawhorse clamp for securing a horizontal cross-piece to a pair of depending diverging legs, the combination of: a pair of clamp members each comprising a box-like member including an outer plate, a pair of side plates perpendicular to said outer plate and extending from the side edges thereof to define therebetween a leg receiving channel, and a top plate perpendicular to said outer plate and extending from the top edge thereof and between said side plates to close the upper end of said channel, said top and side plates being formed integrally with said outer plate, an inner edge portion of said top plate being turned down and extending in parallel spaced relation to said outer plate to define a leg receiving socket at the upper end of said channel, the upper half of the inner edges of said side plates having a plurality of teeth spaced therealong for engaging and biting into said cross-piece, and a median portion of both of said side plates comprising ears extending inwardly from said outer plate beyond said teeth and having a pin receiving aperture therein, said clamp members being disposed in opposed relation with the teeth of one clamp member facing the teeth of the other clamp member and with the ears of one overlapping the ears of the other to align said pin receiving apertures; a hinge pin for each of said overlapped ears, said pins being disposed in said apertures and hingedly connecting said clamp members for relative pivotal movement to clamp said cross-piece between the teeth on said opposed clamp members; a brace member for each of said clamps extending between and secured to the side plates thereof in spaced parallel relation to said outer plate to define with said outer plate and said side plates a rectangular opening for receiving one of said legs, said braces being disposed below and spaced from said top plates, said outer plate having formed therein a plurality of apertures for receiving fastening devices to be passed therethrough and into said legs; and a toggle link mechanism interconnecting said clamp members below said pins, said mechanism comprising two pairs of links extending parallel to and between corresponding side plates of said clamp members, hinge means joining adjacently disposed ends of the links of each pair, pivots connecting the opposite ends of said links to said side plates for movement of said links from an open position disposing said hinge means above a line joining said pivots to a closed position disposing said hinge means substantially on said line, and stop means carried by said links for limiting downward movement of said hinge means to said closed position.

2. In a sawhorse clamp for securing a horizontal cross-piece to a pair of depending diverging legs, the combination of: a pair of clamp members each comprising a box-like member including an outer plate, a pair of side plates perpendicular to said outer plate and extending from the side edges thereof to define therebetween a leg receiving channel, and a top plate perpendicular to said outer plate and extending from the top edge thereof and between said side plates to close the upper end of said channel, an inner edge portion of said top plate being turned down and extending in parallel spaced relation to said outer plate to define a leg receiving socket at the upper end of said channel, the upper half of the inner edges of said side plates having a plurality of teeth spaced therealong for engaging and biting into said cross-piece, and a median portion of both of said side plates comprising ears extending inwardly from said outer plate beyond said teeth and having a pin receiving aperture therein, said clamp members being disposed in opposed relation with the teeth of one clamp member facing the teeth of the other clamp member and with the ears of one overlapping the ears of the other to align said pin receiving apertures; a hinge pin for each of said overlapped ears, said pins being disposed in said apertures and hingedly connecting said clamp members for relative pivotal movement to clamp said cross-piece between the teeth on said opposed clamp members; a brace member for each of said clamps extending between and secured to the side plates thereof in spaced parallel relation to said outer plate to define with said outer plate and said side plates a rectangular opening for receiving one of said legs, said braces being disposed below and spaced from said top plates; and a toggle link mechanism interconnecting said clamp members below said pins, said mechanism comprising two pairs of links extending parallel to and between corresponding side plates of said clamp members, hinge means joining adjacently disposed ends of the links of each pair, pivots connecting the opposite ends of said links to said side plates for movement of said links from an open position disposing said hinge means above a line joining said pivots to a closed position disposing said hinge means substantially on said line, and stop means carried by said links for limiting downward movement of said hinge means to said closed position.

3. In a sawhorse clamp for securing a horizontal cross-piece to a pair of depending diverging legs, the combination of: a pair of clamp members each comprising a box-like member including an outer plate, a pair of side plates perpendicular to said outer plate and extending from the side edges thereof to define therebetween a leg receiving channel, and a top plate perpendicular to said outer plate and extending from the top edge thereof and between said side plates to close the upper end of said channel, an inner edge portion of said top plate being turned down and extending in parallel spaced relation to said outer plate to define a leg receiving socket at the upper end of sadi channel, the upper half of the inner edges of said side plates having a plurality of teeth spaced therealong for engaging and biting into said cross-piece, and a median portion of both of said side plates comprising ears extending inwardly from said outer plate beyond said teeth and having a pin receiving aperture therein, said clamp members being disposed in opposed relation with the teeth of one clamp member facing the teeth of the other clamp member and with the ears of one overlapping the ears of the other to align said pin receiving apertures; a hinge pin for each of said overlapped ears, said pins being disposed in said apertures and hingedly connecting said clamp members for relative pivotal movement to clamp said crosspiece between the teeth on said opposed clamp members; a brace member for each of said clamps extending between and secured to the side plates thereof in spaced parallel relation to said outer plate to define with said outer plate and said side plates a rectangular opening for receiving one of said legs, said braces being disposed below and spaced from said top plates; and a toggle link mechanism interconnecting said clamp members below said pins and operable to force the lower portions of said clamp members apart to thereby clamp said cross-piece between the teeth of said opposed clamp members.

EDWIN L. HOLLYWOOD.

REFERENCES CITED

The following references are of record in the file of this patent:

UNITED STATES PATENTS

| Number | Name | Date |
|---|---|---|
| 128,332 | Smith | June 25, 1872 |
| 872,722 | Fravel | Dec. 3, 1907 |
| 1,656,558 | Dysinger | Jan. 17, 1928 |
| 1,893,165 | Fortune | Jan. 3, 1933 |
| 2,112,778 | Kacena | Mar. 29, 1938 |
| 2,132,285 | Brown | Oct. 4, 1938 |
| 2,261,217 | Bond | Nov. 4, 1941 |
| 2,231,519 | Claude-Mantle | Feb. 11, 1941 |
| 2,317,444 | Dalton | Apr. 27, 1943 |
| 2,412,716 | Campbell | Dec. 17, 1946 |